United States Patent
Berger et al.

(10) Patent No.: US 8,856,808 B2
(45) Date of Patent: Oct. 7, 2014

(54) EVENT TRIGGERED ACTIONS BASED ON MEDIA ACTION TABLE

(75) Inventors: Richard Berger, Culver City, CA (US); John Calkins, Los Angeles, CA (US)

(73) Assignees: Sony Corporation, Tokyo (JP); Sony Pictures Technologies Inc., Culver City, CA (US)

( * ) Notice: Subject to any disclaimer, the term of this patent is extended or adjusted under 35 U.S.C. 154(b) by 0 days.

(21) Appl. No.: 13/228,265

(22) Filed: Sep. 8, 2011

(65) Prior Publication Data

US 2012/0084796 A1 Apr. 5, 2012

Related U.S. Application Data

(60) Provisional application No. 61/381,018, filed on Sep. 8, 2010.

(51) Int. Cl.
*G06F 13/00* (2006.01)
*G06F 9/54* (2006.01)

(52) U.S. Cl.
CPC .................................. *G06F 9/542* (2013.01)
USPC ........................................................ 719/318

(58) Field of Classification Search
CPC ...................................................... G06F 9/542
USPC ........................................................ 719/318
See application file for complete search history.

(56) References Cited

U.S. PATENT DOCUMENTS

| | | | |
|---|---|---|---|
| 7,251,504 B2 * | 7/2007 | Lee et al. ....................... | 455/566 |
| 7,499,715 B2 * | 3/2009 | Carro et al. .................. | 455/456.3 |
| 7,697,923 B2 | 4/2010 | Eronen | |
| 7,761,816 B2 * | 7/2010 | Goldfarb et al. ............. | 715/864 |
| 2008/0101566 A1 | 5/2008 | Medved et al. | |
| 2008/0212943 A1 | 9/2008 | Frohlich et al. | |
| 2011/0185313 A1 * | 7/2011 | Harpaz et al. ................. | 715/826 |

* cited by examiner

*Primary Examiner* — Andy Ho

(74) *Attorney, Agent, or Firm* — Procopio, Cory, Hargreaves & Savitch, LLP (57) ABSTRACT

Generating event-triggered actions, including: detecting at least one event occurring on a mobile device; generating and presenting an event action parameter for the at least one event; and receiving and processing the event action parameter using a media action table to generate at least one action instruction.

18 Claims, 5 Drawing Sheets

EVENT TRIGGERED ACTIONS BASED ON MEDIA ACTION TABLE

CROSS-REFERENCE TO RELATED APPLICATIONS

This application claims the benefit of priority under 35 U.S.C. §119(e) of U.S. Provisional Patent Application No. 61/381,018, filed Sep. 8, 2010, entitled "Video Ring Tones." The disclosure of the above-referenced application is incorporated herein by reference.

BACKGROUND

1. Field of the Invention

The present invention relates to mobile devices, and more specifically, to event-triggered actions implemented on mobile devices.

2. Background

Recently, the number of features that have been incorporated into devices such as mobile telephones has increased dramatically. With increases in memory and processing capabilities in mobile devices, manufacturers have been able to greatly increase the number of features on such devices, permitting users to greatly customize their own products. One such feature involves ring tones associated with initiating and receiving telephone calls. Many mobile telephones indicate the arrival of an incoming call with a customizable ring tone. Some systems permit a user to change the ring tone for different individuals, providing an indication of who has placed a call. Other systems enable users to literally create their own ring tones. Traditionally, many users have also been able to observe basic information about another party on an actual or attempted telephone call. For example, a user is often able to see the name and telephone number of a person to whom a call is being made or of the person who is initiating such a call.

SUMMARY

Implementations of the present invention provide for generating event-triggered actions.

In one implementation, a method of generating event-triggered actions is disclosed. The method includes: detecting at least one event occurring on a mobile device; generating and presenting an event action parameter for the at least one event; and receiving and processing the event action parameter using a media action table to generate at least one action instruction.

In another implementation, an event-triggered action generator is disclosed. The generator includes: an event detector to detect at least one event occurring on a mobile device and send a detection indicator when the at least one event is detected; an event action parameter generator to generate and send an event action parameter when the detection indicator is received from the event detector; and a media action table configured to receive and process the event action parameter to generate at least one action instruction.

In another implementation, a non-transitory tangible storage medium storing a computer program for generating event-triggered actions is disclosed. The computer program comprises executable instructions that cause a computer to: detect at least one event occurring on a mobile device; generate and present an event action parameter for the at least one event; and receive and process the event action parameter using a media action table to generate at least one action instruction.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which.

DETAILED DESCRIPTION

Certain implementations as disclosed herein provide for event-triggered actions based on a media action table. In one implementation, when an event is detected on a mobile device, an action to be performed is determined by generating an event-action parameter and presenting the parameter to a media action table. In reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In one implementation, when an event, such as an incoming or outgoing call, is detected on a mobile device, the mobile device generates an event-action parameter (EAP) to identify the event so that the event can be presented to a media action table. For example, when an incoming call from person A is detected, an action to be performed can include playing a video clip associated with person A which is stored in storage B of the mobile device. The mobile device then generates an EAP which identifies the event as an incoming call from A and includes a reference to storage B so that the video clip can be accessed from storage B. In another example, when an outgoing call to person C is detected, the mobile device generates an EAP which identifies the event as an outgoing call to C and includes a reference to a video clip remotely stored in remote storage D so that the video clip can be accessed by person C. The action to be performed can include making a call to person C and attaching a reference to the video clip remotely stored in storage D. In these examples, the video clip can be stored on the mobile device already, downloaded as needed, or streamed.

In another example, a user selects a clip from video clips stored on the mobile device and sets an outgoing call parameter to associate the selected video clip with outgoing calls. When the user calls another person, the caller's mobile device sends the selected video clip to the receiving device and the receiving device plays the video (if the receiving device is compatible and authorized to receive video clips, in general or from that person). Alternatively, the user can also select a person and associate the selected video clip with the selected person so that the selected video is sent to the recipient only when a call is placed to the selected person. In another example, the user selects a video that is stored remotely (e.g., on a network server) and a reference is used to play the video (e.g., the calling device sends a link to the receiving device and the receiving device uses the link to stream the video from the server indicated in the link). In another example, the video clip is selected by someone other than the user, such as by the phone service or by the account holder. For example, a company that provides mobile devices to employees may select a video clip that is sent to recipients (e.g., a company advertisement). In another similar example, the phone service (either the caller or receiver, or both) selects an advertisement to send for display and provides a subscription discount to the calling subscriber and/or the receiving subscriber in exchange for the advertisement placement. In another example, the mobile device (either caller or receiver) selects a video clip based on current information, such as time of day, location, weather, indicated mood of the caller, etc.

In these examples, the mobile device first generates the EAPs so that they can be presented to a media action table. In one implementation, the media action table is programmable such that when a response is made to the action, the media action table can be updated or re-programmed corresponding to the response. For example, when an incoming call from person A with an attached video clip is detected, and the video clip is played for person B on the mobile device, person B can respond to the caller (i.e., person A) indicating a request for a different video clip or different media type. In this case, A's mobile device can update or re-program the media action table so that the same EAP when presented to the updated media action table performs a different action based on the response from person B.

Figure 1:
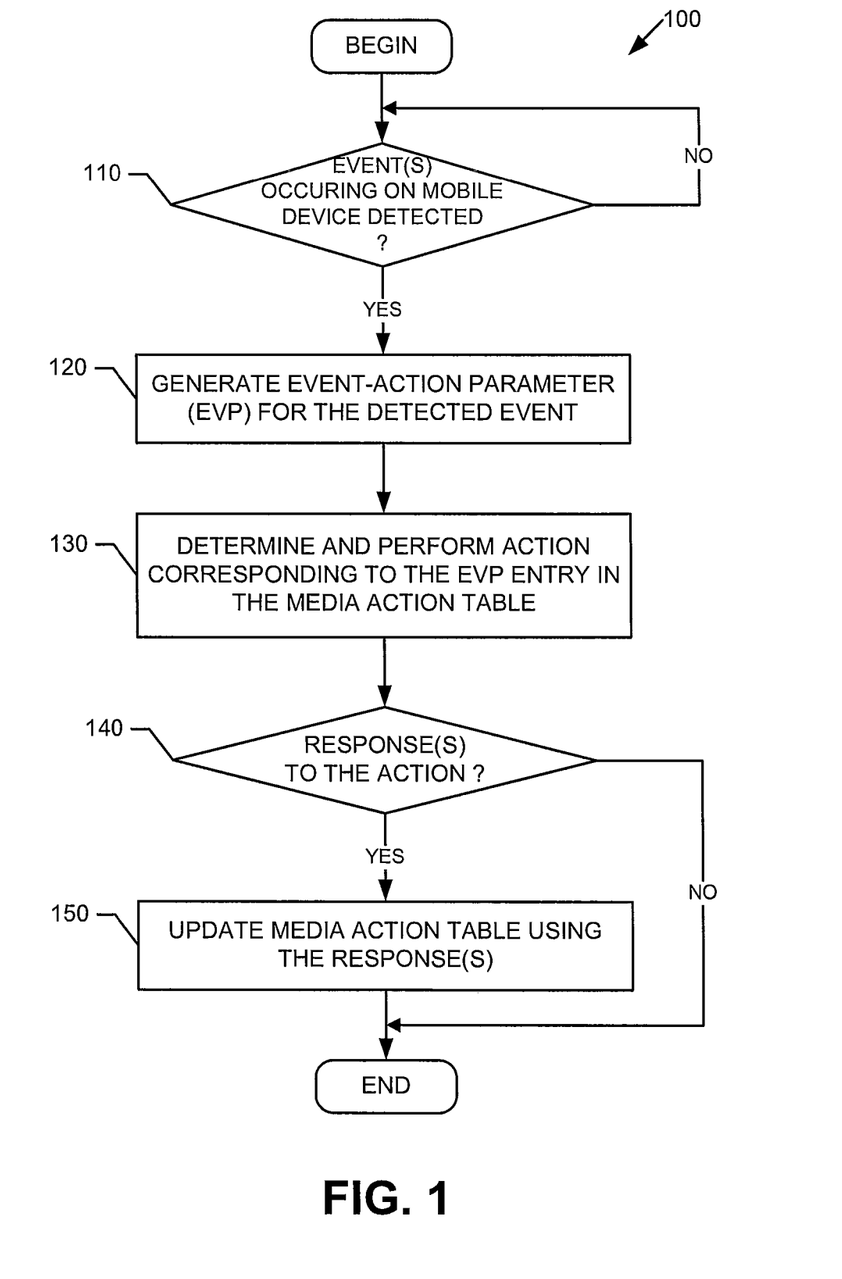
FIG. 1 is a flowchart illustrating a technique for generating event-triggered actions based on a media action table in accordance with one implementation of the present invention.

FIG. 1 is a flowchart 100 illustrating a technique for generating event-triggered actions based on a media action table in accordance with one implementation of the present invention. The technique also includes generating an event action parameter (EAP) to be presented to the media action table.

In the illustrated implementation of FIG. 1, when event(s) occurring on a mobile device is detected, at 110, an event action parameter is generated for the detected event, at 120. Examples of event(s) occurring on a mobile device include incoming calls, outgoing calls, alarm events, incoming texts, outgoing texts, calendar events, advertisement alerts, etc. The EAP can have various different formats and contents. For example, for an incoming call, the EAP can include an identity of the caller, an action code, a media storage address, a media file itself, etc.

An action to be performed is then determined, at box 130, corresponding to the EAP entry in the media action table. For example, an incoming call may generate an EAP identifying an incoming call from person A with an action code B. When the generated EAP is presented to the media action table, the action corresponding to the EAP may indicate selecting and playing a video clip remotely stored in storage B. In another example, an incoming call may generate an EAP identifying an incoming call from person A with attached video clip C. When the generated EAP is presented to the media action table, the action corresponding to the EAP may indicate playing video clip C.

As discussed above, when response(s) to the action is detected, at box 140, the media action table is updated, at box 150, using the response(s). For example, when an incoming call from person A with attached video clip C is detected, and the video clip is played on the person B's mobile device, person B can respond to the caller (i.e., person A) indicating a request for different video clip D on the next call. In this case, the person A's mobile device updates the media action table so that the same EAP when presented to the updated media action table performs a different action such that the person A's mobile device generates an outgoing call to person B with a reference attachment to a remote storage which stores video clip D.

Figure 2A:
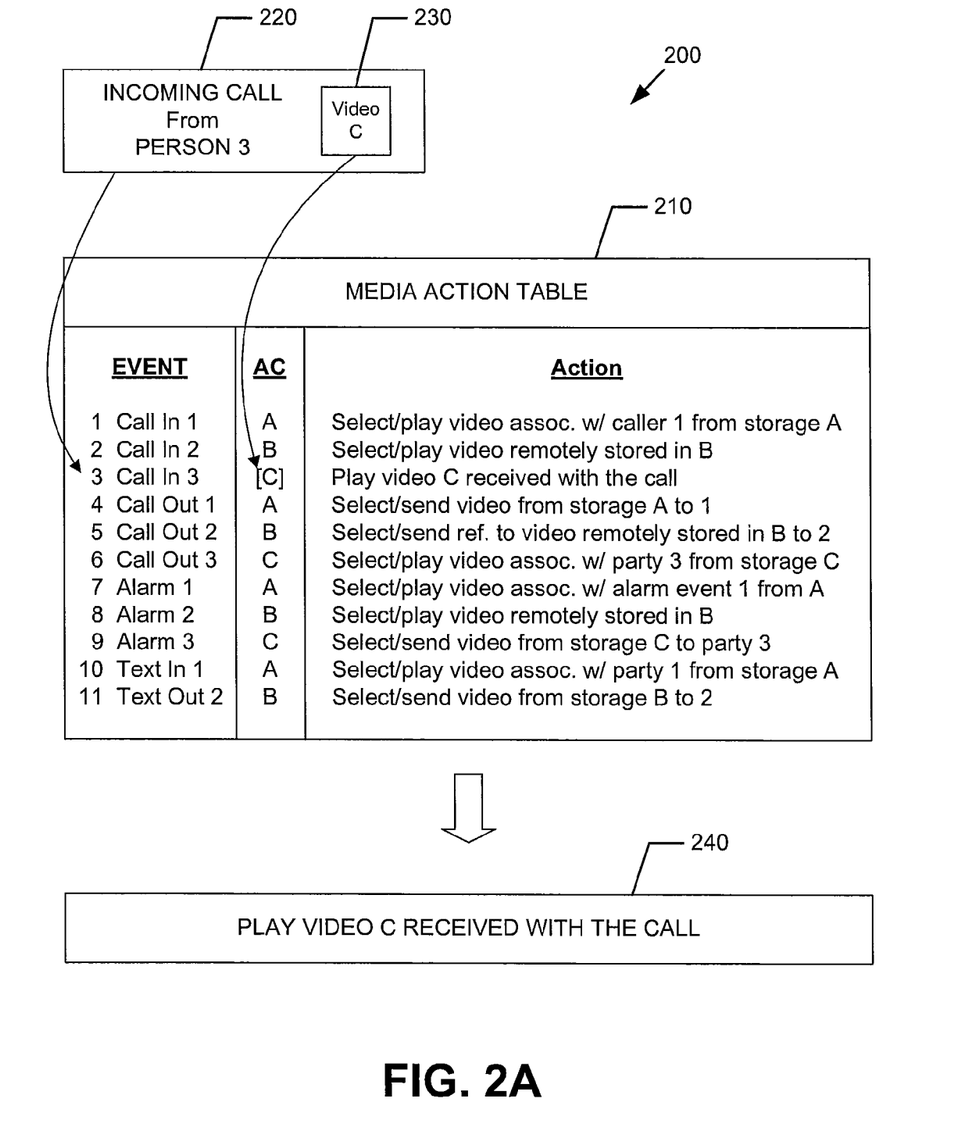
FIG. 2A is a functional diagram illustrating a process for generating event-triggered actions based on presenting an event action parameter (EAP) to a media action table in accordance with one implementation of the present invention.

FIG. 2A is a functional flow diagram 200 illustrating a process for generating event-triggered actions based on presenting an event action parameter (EAP) 220 to a media action table 210 in accordance with one implementation of the present invention. In the illustrated implementation of FIG. 2A, when event(s) occurring on a mobile device is detected, an EAP 220 is generated for the detected event. The EAP 220 includes identification(s) of the event such as an identity of the caller, a direction of the call (i.e., incoming or outgoing), the event type (e.g., incoming call or alarm event), an action code (specifies an action variation/indication 230), etc.

In one implementation, the action variation/indication 230 identifies the storage address where the media is stored. In another implementation, the action variation/indication 230 also identifies the location of the storage (e.g., local or remote). In another implementation, the action variation/indication 230 includes the media file itself. Examples of event(s) occurring on a mobile device include incoming calls, outgoing calls, alarm events, incoming texts, outgoing texts, calendar events, advertisement alerts, etc. The EAP can have various different formats and contents.

In one implementation, the media action table 210 receives the EAP 220 and processes it to generate an instruction 240 which determines the action to be performed. In the illustrated implementation of FIG. 2A, an incoming call from person 3 with attached video C generates an EAP 220 identifying an incoming call from person 3 with an action variation/indication 230 of video C. When the generated EAP 220 is presented to the media action table 210, the action corresponding to the EAP 220 indicates playing video C received with the call. The identified action is output as an action instruction 240 to play video C received with the call.

Figure 2B:
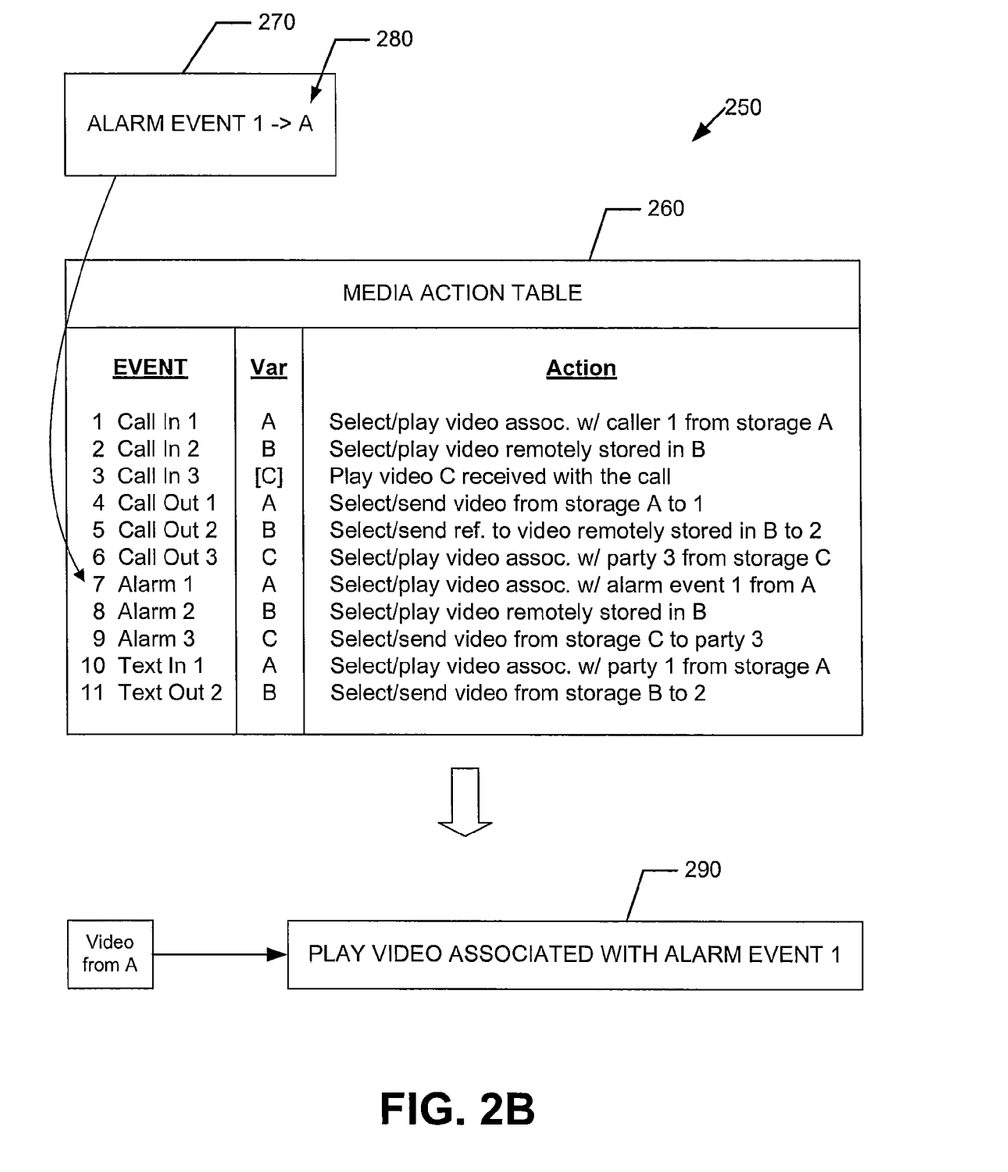
FIG. 2B is a functional diagram illustrating another process for generating event-triggered actions based on presenting an event action parameter (EAP) to a media action table in accordance with another implementation of the present invention.

FIG. 2B is a functional flow diagram 250 illustrating another process for generating event-triggered actions based on presenting an event action parameter (EAP) 270 to a media action table 260 in accordance with another implementation of the present invention. In the illustrated implementation of FIG. 2B, an EAP 270 identifies alarm event 1 with action code A 280. In one implementation, the action code is user programmed such that when an alarm event is detected, an action variation specified by the action code is performed. In another implementation, the action code is automatically generated corresponding to the type of the detected event. When the generated EAP 270 is presented to the media action table 260, the action corresponding to the EAP 270 indicates selecting and playing a video clip (associated with alarm event 1) stored in address A. The identified action is output as an action instruction 290 to play the video retrieved from address A.

As discussed above, when response(s) to the performed action is detected, the media action table 260 can be updated using the response(s). In the illustrated example, when alarm event 1 (with action code A) is detected, and the video clip retrieved from address A is played on the mobile device, the user of the mobile device can respond to the action by indicating a request for a different video clip (e.g., a video clip from address X) on the next alarm event 1. In this case, the action column of the media action table 260 is updated to "select/play video associated with alarm event 1 from X." Thus, the same EAP (i.e., alarm event 1 with action code A) when presented to the updated media action table 260 now generates an action instruction 290 which directs the mobile device to select and play a video clip from address X (rather than address A) in response to alarm event 1.

Figure 3:
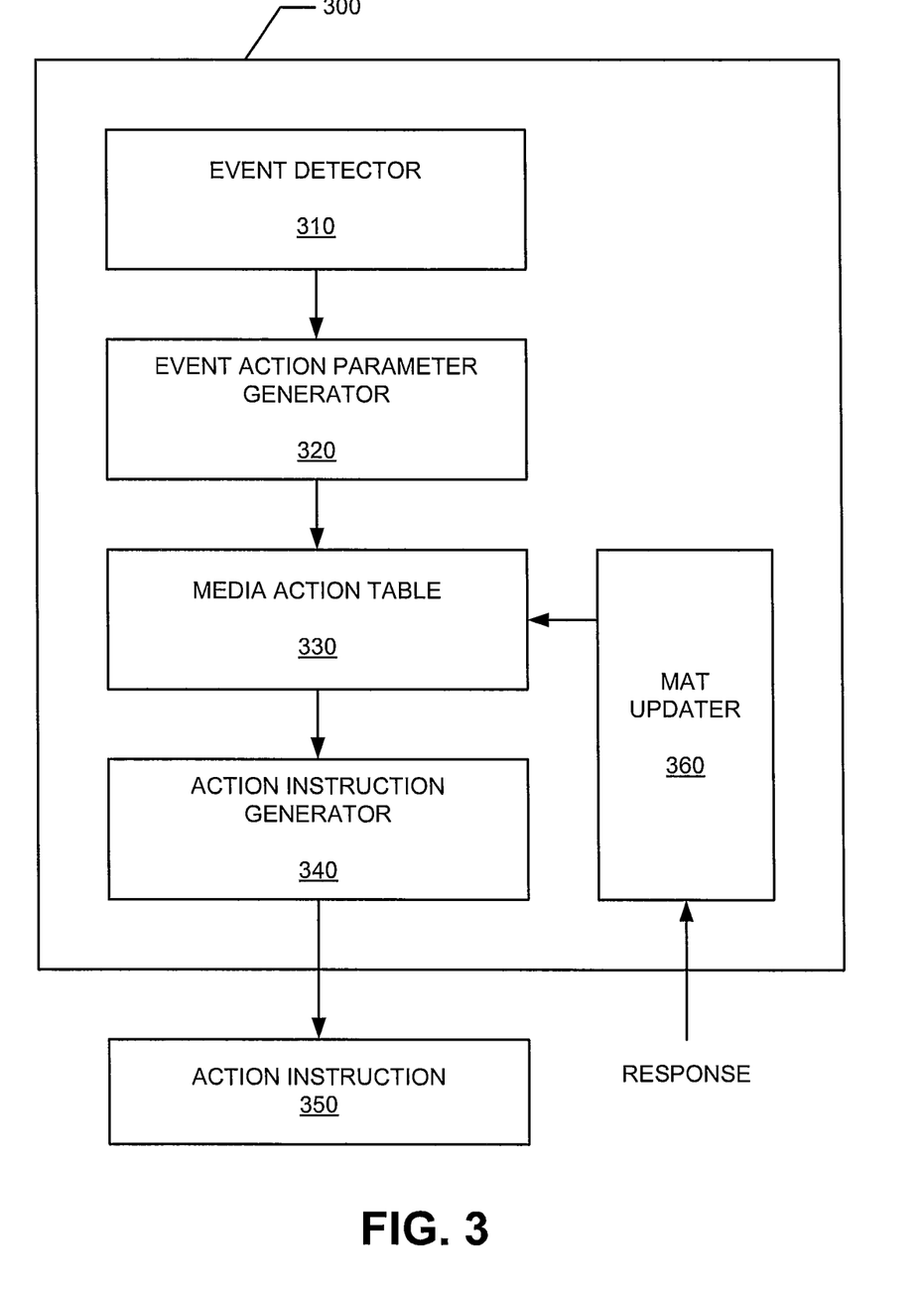
FIG. 3 is a functional block diagram of an event-triggered action generator in accordance with one implementation of the present invention.

FIG. 3 is a functional block diagram of an event-triggered action generator 300 in accordance with one implementation of the present invention. In one implementation, the event-triggered action generator 300 is implemented in hardware configured within a mobile device (not shown). In another implementation, the generator 300 is implemented as a stand-alone hardware device configured to be attachable to a mobile device. In the illustrated implementation of FIG. 3, the event-triggered action generator 300 includes an even detector 310, an event action parameter generator 320, a media action table 330, an action instruction generator 340, and a VAT updater 360.

The event detector 310 detects event(s) occurring on a mobile device, and sends a detection indicator when the event(s) is detected. Examples of event(s) occurring on a mobile device include incoming calls, outgoing calls, alarm events, incoming texts, outgoing texts, calendar events, advertisement alerts, etc. The event action parameter generator 320 generates an event action parameter (EAP) when the detection indicator is received from the event detector 310. The EAP can have various different formats and contents. For example, for an incoming call, the EAP can include an identity of the caller, an action code, a media storage address, a media file itself, etc.

In one implementation, once the EAP is generated by the EAP generator 320, the generated EAP is sent to the media action table 330 which uses it to generate an action instruction 350. In another implementation, a separate action instruction generator 340 generates an action instruction based on an instruction entry from the media action table 330.

In one implementation, the action instruction is generated corresponding to the EAP entry in the media action table 330. For example, an incoming call may generate an EAP identifying an incoming call from person A with an action code B. When the generated EAP is presented to the media action table 330, an entry in the table corresponding to the EAP may indicate selecting and playing a video clip remotely stored in storage B. In another example, an incoming call may generate an EAP identifying an incoming call from person A with attached video clip C. When the generated EAP is presented to the media action table, an entry in the table corresponding to the EAP may indicate playing video clip C.

When response(s) to the action is received at the media action table (MAT) updater 360, the media action table 330 is updated using the response(s). In one implementation, the MAT updater 360 includes a table adjuster that adjusts or updates the media action table such that when a same event action parameter is presented to the media action table after the adjustment, different action instructions corresponding to the response(s) are issued by the video action table 330 or the action instruction generator 340. For example, when an incoming call from person A with attached video clip C is detected, and the video clip is played on the person B's mobile device, person B can respond to the caller (i.e., person A) indicating a request for different video clip D on the next call. In this case, the person A's mobile device updates the media action table so that the same EAP when presented to the updated media action table performs a different action such that the person A's mobile device generates an outgoing call to person B with a reference attachment to a remote storage which stores video clip D.

Figure 4A:
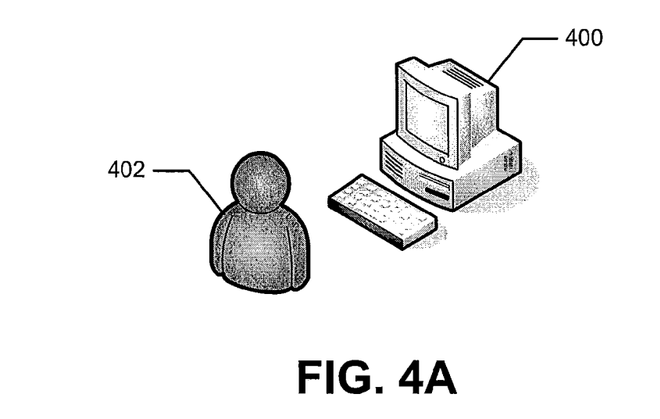
FIG. 4A illustrates a representation of a computer system and a user.

FIG. 4A illustrates a representation of a computer system 400 and a user 402. The user 402 can use the computer system 400 to implement event-triggered action generation. The computer system 400 stores and executes an event-triggered action generator 490.

Figure 4B:
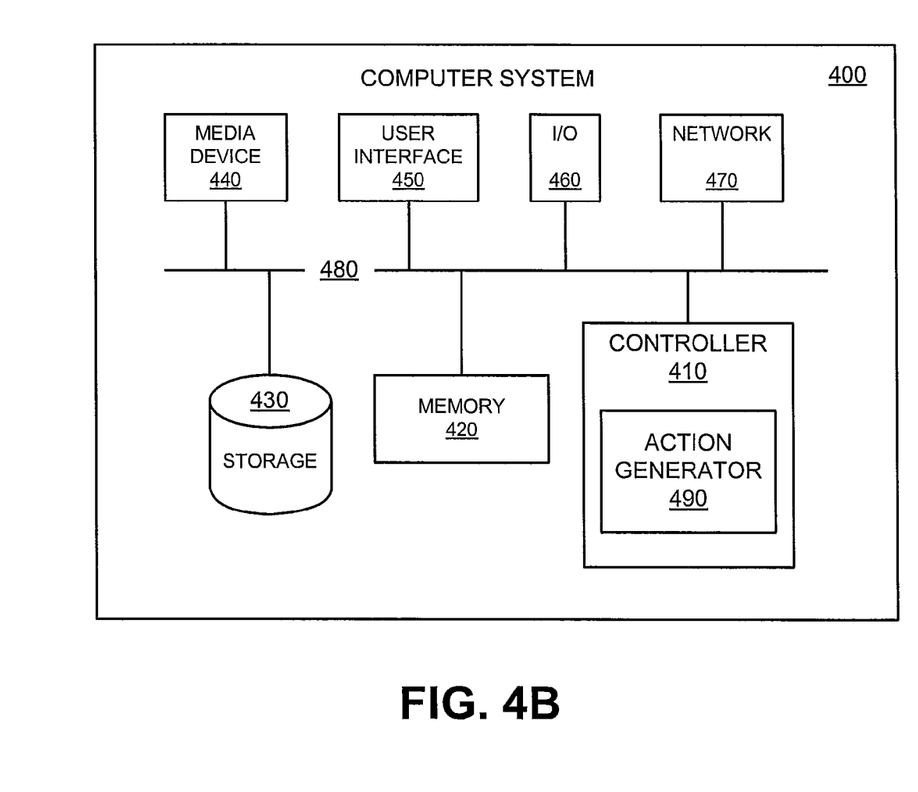
FIG. 4B is a functional block diagram illustrating the computer system hosting the event-triggered action generator in accordance with one implementation of the present invention.

FIG. 4B is a functional block diagram illustrating the computer system 400 hosting the event-triggered action generator 490 in accordance with one implementation of the present invention. The controller 410 is a programmable processor and controls the operation of the computer system 400 and its components. The controller 410 loads instructions from the memory 420 or an embedded controller memory (not shown) and executes these instructions to control the system. In its execution, the controller 410 provides the event-triggered action generator 490 as a software system. Alternatively, this service can be implemented as separate components in the controller 410 or the computer system 400.

Memory 420 stores data temporarily for use by the other components of the computer system 400. In one implementation, memory 420 is implemented as RAM. In another implementation, memory 420 also includes long-term or permanent memory, such as flash memory and/or ROM.

Storage 430 stores data temporarily or long term for use by other components of the computer system 400, such as for storing data used by the event-triggered action generator 490. In one implementation, storage 430 is a hard disk drive.

The media device 440 receives removable media and reads and/or writes data to the inserted media. In one implementation, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

A system communication path 480 (e.g., a system communication bus) provides for transfers of data and control information between the media device 440, user interface 450, I/O interface 460, network interface 470, storage 430, memory 420, and controller 410.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

Various illustrative implementations of the present invention have been described. However, one of ordinary skill in the art will see that additional implementations are also possible and within the scope of the present invention. For example, content other than video clips can be selected, used, and/or transmitted/pushed, such as audio, images, or text. In another example, although the description discusses generating actions on a mobile device, actions can be generated for any media device. In a further example, although the described examples generally discuss generating one action, more than one action can be generated in response to one or more events. Accordingly, the present invention is not limited to only those implementations described above. It is further understood that the scope of the present invention fully encompasses other implementations that may become obvious to those skilled in the art and that the scope of the present invention is accordingly limited by nothing other than the appended claims.

What is claimed is:

1. A method of generating event-triggered actions, the method comprising:
   detecting at least one event occurring on a mobile device;
   generating and presenting an event action parameter to a media action table for the at least one event; and
   receiving and processing the event action parameter corresponding to the at least one event using the media action table to generate at least one action instruction,
   wherein the event action parameter includes an action code and a video file associated with the at least one event such that the video file is received with the at least one event and is played on the mobile device once the at least one event is detected on the mobile device,
   wherein the media action table uses the action code and the associated at least one action instruction to select and download the video file without having to receive the video file with the at least one event.

2. The method of claim 1, wherein the at least one event comprises
   at least one of incoming calls, outgoing calls, alarm events, incoming texts, outgoing texts, calendar events, and advertisement alerts.

3. The method of claim 1, wherein the at least one event is an incoming call and the at least one action instruction is to play the video file received with the incoming call.

4. The method of claim 1, further comprising:
   receiving at least one response to the at least one action instruction; and
   updating the media action table using the at least one response.

5. The method of claim 4, wherein updating the media action table comprises
   adjusting the media action table into a state that when presented with the same event action parameter, generates at least one new action instruction corresponding to the at least one response.

6. The method of claim 1, wherein the action code is filled in with a name of the video file associated with the at least one event.

7. The method of claim 1, wherein the media action table includes an event identifier which identifies the at least one event as advertisement alerts.

8. An event-triggered action generator, comprising:
   an event detector to detect at least one event occurring on a mobile device and send a detection indicator when the at least one event is detected;
   an event action parameter generator to generate and send an event action parameter to a media action table corresponding to the at least one event when the detection indicator is received from the event detector; and
   a media action table configured to receive and process the event action parameter corresponding to the at least one event using the media action table to generate at least one action instruction,
   wherein the event action parameter includes an action code and a video file associated with the at least one event such that the video file is received with the at least one event and is played on the mobile device once the at least one event is detected on the mobile device,
   wherein the media action table uses the action code and the associated at least one action instruction to select and download the video file without having to receive the video file with the at least one event.

9. The generator of claim 8, wherein the at least one event comprises
   at least one of incoming calls, outgoing calls, alarm events, incoming texts, outgoing texts, calendar events, and advertisement alerts.

10. The generator of claim 8, further comprising
    a media action table (MAT) updater configured to receive at least one response to the at least one action instruction, and to update the media action table using the at least one response.

11. The generator of claim 8, wherein the at least one event is an incoming call and the at least one action instruction is to play the video file received with the incoming call.

12. The generator of claim 8, wherein the action code is filled in with a name of the video file associated with the at least one event.

13. The generator of claim 8, wherein the media action table includes an event identifier which identifies the at least one event as advertisement alerts.

14. A non-transitory tangible storage medium storing a computer program for generating event-triggered actions, the computer program comprising executable instructions that cause a computer to:
    detect at least one event occurring on a mobile device;
    generate and present an event action parameter to a media action table for the at least one event; and
    receive and process the event action parameter corresponding to the at least one event using the media action table to generate at least one action instruction,
    wherein the event action parameter includes an action code and a video file associated with the at least one event such that the video file is received with the at least one event and is played on the mobile device once the at least one event is detected on the mobile device,
    wherein the media action table uses the action code and the associated at least one action instruction to select and download the video file without having to receive the video file with the at least one event.

15. The non-transitory tangible storage medium of claim 14, wherein the at least one event is an incoming call and the at least one action instruction is to play the video file received with the incoming call.

16. The non-transitory tangible storage medium of claim 14, wherein the media action table includes an event identifier which identifies the at least one event as advertisement alerts.

17. The non-transitory tangible storage medium of claim 14, further comprising executable instructions that cause a computer to:
    receive at least one response to the at least one action instruction; and
    update the media action table using the at least one response.

18. The non-transitory tangible storage medium of claim 17, wherein executable instructions that cause a computer to update the media action table comprise executable instructions that cause a computer to
   adjust the media action table into a state that when presented with the same event action parameter, generates at least one new action instruction corresponding the at least one response.

* * * * *